United States Patent [19]

Muska et al.

[11] 4,076,375
[45] Feb. 28, 1978

[54] DIRECTIONAL OPTICAL WAVEGUIDE COUPLER AND POWER TAP ARRANGEMENT

[75] Inventors: Willis Martin Muska, Little Silver; Stewart David Personick, Middletown, both of N.J.

[73] Assignee: Bell Telephone Laboratories, Incorporated, Murray Hill, N.J.

[21] Appl. No.: 644,304

[22] Filed: Dec. 24, 1975

[51] Int. Cl.² .................................................. G02B 5/14
[52] U.S. Cl. ............................... 350/96.15; 350/96.30
[58] Field of Search ..................... 350/96 C, 96 WG

[56] References Cited

U.S. PATENT DOCUMENTS

| | | | |
|---|---|---|---|
| 3,777,149 | 12/1973 | Marcatili | 350/96 C X |
| 3,779,628 | 12/1973 | Kapron et al. | 350/96 WG |
| 3,780,295 | 12/1973 | Kapron et al. | 350/96 C X |
| 3,808,549 | 4/1974 | Maurer | 350/96 C X |
| 3,832,028 | 8/1974 | Kapron | 350/96 WG |
| 3,931,518 | 1/1976 | Miller | 350/96 C X |
| 3,936,631 | 2/1976 | Muska | 350/96 C X |
| 3,948,582 | 4/1976 | Martin | 350/96 C |

OTHER PUBLICATIONS

Keck et al., Article in Applied Physics Letters, Sept. 1, 1972 pp. 215-217 cited.

*Primary Examiner*—John K. Corbin
*Assistant Examiner*—John D. Lee
*Attorney, Agent, or Firm*—Erwin W. Pfeifle

[57] ABSTRACT

A directional optical waveguide coupler and power tap is disclosed for use with optical fibers or planar-form optical waveguides. Abutted to the end of a cladded optical transmission waveguide is a section of a second optical waveguide comprising a core surrounded by a cladding layer, the core having a smaller cross-sectional area than the core of the transmission waveguide. In the present arrangement, light energy propagating in the core of the second waveguide towards the transmission waveguide is coupled into the core of the transmission waveguide at the point of abutment, whereas light energy propagating in the core of the transmission waveguide towards the second waveguide is coupled into both the core and cladding layer of the second waveguide at the point of abutment. Means disposed along the second waveguide adjacent the point of abutment couples out of the cladding layer the cladding modes transferred from the core-guided modes of the transmission waveguide for subsequent conversion into a representative electrical signal. A stripper-absorber means is also disposed along the second waveguide for removing spurious cladding modes propagating thereunder towards both the coupling out means and the point of abutment between the two waveguides.

7 Claims, 1 Drawing Figure

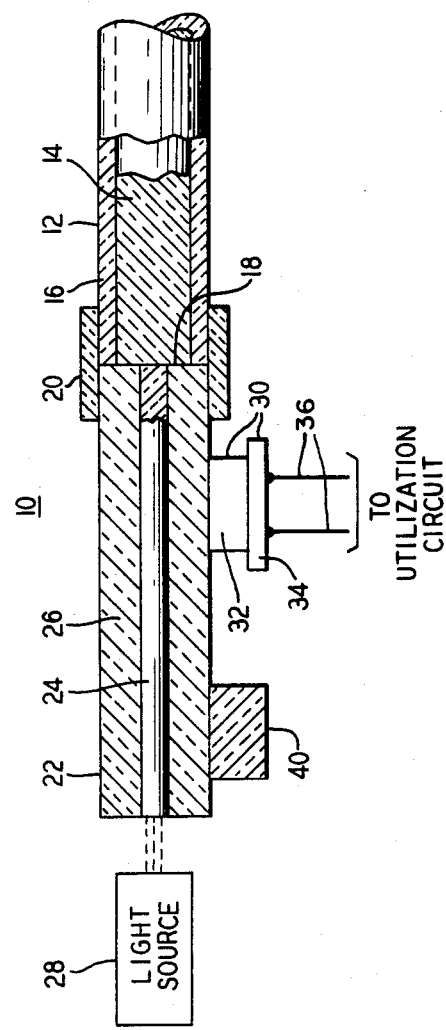

DIRECTIONAL OPTICAL WAVEGUIDE COUPLER AND POWER TAP ARRANGEMENT

BACKGROUND OF THE INVENTION

The present invention relates to a directional optical waveguide coupler and power tap, and, more particularly, to a directional optical waveguide coupler and power tap wherein a portion of the light energy propagating in a first direction in a first optical waveguide is coupled into the cladding of a section of a second optical waveguide for subsequent removal therefrom and conversion into a representative electrical signal.

In future optical fiber transmission systems, it is expected that arrangements will be required for extracting signal wave information from optical waveguides for varied purposes. Arrangements for tapping signal power from an intermediate portion of an optical fiber waveguide are known. For example, in patent application Ser. No. 522,519 of S. E. Miller, now U.S. Pat. No. 3,931,518, an arrangement is disclosed wherein means for coupling core-guided modes, propagating in an optical waveguide, into cladding modes is provided in combination with a fiber tap which removes the coupled out cladding modes for subsequent conversion into a representative electrical signal. The mode coupling means illustratively takes the form of one or more corrugated plates which are pressed against the fiber to periodically deform a region of the fiber just preceding the fiber tap. Provided the spatial periodicity of the corrugations in the plates is properly selected, and the pressure exerted on the plates is sufficiently large, the periodic deformation of the fiber causes the desired mode coupling, and assures that there is sufficient power distributed in the modes of the fiber for the dielectric coupling body of the fiber to couple out. By adjusting the pressure that the plates exert against the fiber, it is possible to adjust the degree of mode coupling that takes place in the fiber. The above-mentioned Miller arrangement, however, does not prevent spurious cladding modes from reaching the energy tap, and therefore, cannot be considered a directional energy tap.

Prior art directional energy taps have generally included two separate optical waveguides positioned within an intermediate medium and arranged relatively close and substantially parallel to each other. Light propagating in a first direction in one optical waveguide is partially or fully transferred to the other optical waveguide by either the existence of a weak coupling between the two waveguides through the intermediate medium, or the application of electric or magnetic fields to change the coupling between the guides in the region of the intermediate medium. In this regard, see, for instance, U.S. Pat. Nos. 3,408,131, issued on Oct. 29, 1968 to N. S. Kapany; 3,558,213 and 3,589,794, issued on Jan. 26, 1971 and June 29, 1971, respectively to E. A. J. Marcatili; and 3,859,503, issued on Nov. 26, 1974 to L. A. Riseberg et al.

U.S. Pat. No. 3,777,149 issued to E. A. J. Marcatili on Dec. 4, 1973, discloses a signal detection and delay equalization arrangement for multimode optical fibers. In the arrangement, there is disposed adjacent to a terminated end surface of an optical fiber, means for selectively coupling propagating mode components out of the fiber at characteristic angles. The mode coupling means comprises a high index body of a dielectric material which is disposed in a coupling relationship with the fiber core. An array of photodetectors are disposed adjacent the coupling body so that the photodetectors selectively respond to each of the coupled mode components, or to groups of such components at the characteristic angles. The detectors include suitable delays for correcting delay distortion among the various modes, and are connected to a common output circuit.

Arrangements for coupling light from a source, such as, for example, a laser, an uncladded optical fiber, or a thin-film waveguide into a smaller cladded optical fiber are known. In such arrangements, a tapered coupler or junction box directs the light from the larger source into the core of the smaller cladded optical fiber. In this manner, a maximum amount of light energy is coupled into the core of the smaller fiber while avoiding the generation of undesired cladding modes. In this regard, see, for instance, U.S. Pat. Nos. 3,779,628 issued to F. P. Kapron et al. on Dec. 18, 1973 and 3,864,019 issued to G. Smolinsky et al. on Feb. 4, 1975.

SUMMARY OF THE INVENTION

The present invention relates to a directional optical waveguide coupler and power tap, and more particularly, to a directional optical waveguide coupler and power tap wherein a portion of the light energy propagating in a first direction in the core of a first cladded optical waveguide is coupled into the cladding of a section of a smaller-core second optical waveguide abutting an end of the first waveguide for subsequent removal therefrom and conversion into a representative electrical signal. Additionally, means are provided to isolate the cladding of the second optical waveguide from spurious cladding modes propagating in a second direction.

An aspect of the present invention is to provide a directional optical waveguide coupler and power tap usable as a device for measuring the length, or the location of a flaw, in a first optical waveguide.

Another aspect of the present invention is to provide a directional optical waveguide coupler and power tap capable of terminating a portion of an optical signal propagating in a first direction in an optical transmission system using one-way or two-way transmission without intercepting core-guided modes propagating in a second direction.

Other and further aspects of the present invention will become apparent during the course of the following description and by reference to the accompanying drawing.

BRIEF DESCRIPTION OF THE DRAWING

The drawing is a side view of a directional optical waveguide coupler and power tap in accordance with the present invention.

DETAILED DESCRIPTION

The present invention is described primarily with relation to a directional optical waveguide coupler and power tap 10 for use with optical fiber waveguides. However, it will be understood that such description is exemplary only and is for purposes of exposition and not for purposes of limitation. It will be readily appreciated that the inventive concept is equally applicable for use with other optical waveguides, such as, for example, with planar-form optical waveguides.

Referring now to the drawing, in the present directional optical waveguide coupler and power tap 10, a section of a second optical fiber 22 is abutted to an end of a transmission optical fiber 12 at a coupling point 18 within a coupling means 20 of any known form, such as, for example, a metallic sleeve. Each of the transmission and second fibers 12 and 22 consist of a core 14 and 24, respectively, of transparent material having a given refractive index surrounded by a layer 16 and 26, respectively, of transparent cladding material having a refractive index which is less than that of the associated core.

In accordance with the present invention, core 24 of second fiber 22 preferably has a cross-sectional area which is substantially less than the cross-sectional area of core 14 of transmission fiber 12. With such arrangement, light energy introduced into core 24 of second fiber 22 by any known light source 28, such as, for example, a laser, and propagating from left-to-right in the drawing, will only be coupled into core 14 of transmission fiber 12. However, light energy propagating from right-to-left in core 14 of transmission fiber 12 will be coupled into both the core 24 and cladding layer 26 of second fiber 22 at coupling point 18. The amount of light energy coupled into cladding layer 26 from core 14 of transmission fiber 12 is proportional to the cross-sectional area of cladding layer 26 exposed to core 14 of transmission fiber 12. The greater the cross-sectional area of cladding layer 26 exposed to core 14, the greater the amount of light energy coupled into cladding layer 26 from core 14. Ideally, for maximum coupling of the core-guided modes in core 14 into cladding layer 26 of second fiber 22 it is necessary that the outer periphery of cladding layer 26 equal or exceed the outer periphery of core 14. In addition, it is preferable that the outer periphery of cladding layer 26 of second fiber 22 correspond to the outer periphery of cladding layer 16 of transmission fiber 12 to enhance alignment of the two fibers within a relatively simple coupling means 20. It is preferable that the abutting ends of transmission waveguide 12 and second waveguide 22 be relatively smooth to ensure maximum light coupling therebeneath. Additionally, index matching material may be placed at the interface of fibers 12 and 22 to provide reduced reflection and enhance coupling as is well known in the fiber transmission art.

A fiber tap 30 is disposed adjacent coupling point 18 in engagement with cladding layer 26 of second fiber 22. Fiber tap 30 can comprise any well-known device which is capable of converting light energy propagating in an adjacent material into a representative electrical signal. One such arrangement was disclosed in the hereinbefore-cited S. E. Miller application. Typically, such device comprises a disk 32 formed of a relatively compliant dielectric material, such as a soft plastic, having an index of refraction equal to or greater than the index of refraction of cladding layer 26 of second fiber 22. Disk 32 serves to couple optical power out of cladding layer 26 of second fiber 22. When disk 32 is forced against cladding 26, the fiber deforms the upper surface of disk 32 to provide a relatively large area of contact therewith. To convert the coupled out optical power into a representative electrical signal, a photodetector 34 is positioned adjacent the surface of disk 32 opposite that surface which is in contact with cladding 26.

Photodetector 34 is illustratively a solid state photodiode of the p-i-n form, such as the SGD 100A, 100 mil, silicon p-i-n photodiode manufactured and offered commercially by E. G. & G., Inc. It is designed to respond to the wavelength of the optical signal propagating through transmission fiber 12 which is illustratively about 1 micrometer ($\mu$m). The resulting electrical signal is transmitted over leads 36 from photodetector 34 to an external utilization circuit (not shown).

In the drawing, a stripper-absorber means 40 is disposed in contact with cladding layer 26 of second waveguide 22 between fiber tap 30 and the end of second waveguide 22 opposite coupling point 18. Stripper-absorber means 40 functions to absorb cladding modes propagating therebeneath and is shown as comprising a block of dielectric material, which is formed preferably from a relatively compliant material, such as, for example, a soft plastic, to permit a reasonably large area of contact with cladding layer 26. The block of dielectric material can, of course, encircle any part or all of the cladding layer 26. To couple out the cladding modes, the block of dielectric material of stripper-absorber means 40 has a refractive index which is equal to or greater than the refractive index of the material of cladding layer 26. To absorb the coupled out cladding modes, stripper-absorber means 40 can have either ions of a light absorbing material, such as, for example, iron, or cobalt, embedded in the block of dielectric material, or a layer of light absorbing material, such as, for example, carbon black, deposited on the surface of the block of dielectric material opposite the surface in contact with cladding layer 26.

In operation, light energy coupled into core 24 of second fiber 22 from light source 28 either directly or through any other arrangement, such as, for example, that disclosed in the hereinbefore-cited patents of F. P. Kapron et al. and G. Smolinsky et al., propagates from left-to-right beneath stripper-absorber means 40 and fiber tap 30 without effect. Any light energy spuriously introduced into cladding layer 26 from, for instance, light source 28 and propagating from left-to-right in the drawing will be absorbed by stripper-absorber means 40, thereby preventing such cladding modes from reaching fiber tap 30 and coupling point 18. At coupling point 18 all of the light energy propagating in core 24 is coupled into core 14 of transmission fiber 12 where it continues to propagate until either a defect in core 14, an arrangement for coupling the light energy out of fiber 12, or the other end of fiber 12 is encountered.

Light reflected from a defect (such as a crack) or the end of core 14 opposite coupling point 18, or introduced into core 14 at the end opposite coupling point 18 by a separate light source, propagates from right-to-left in core 14 towards coupling point 18. At coupling point 18, the light energy is coupled into both the core 24 and cladding layer 26 of second fiber 22 as was explained hereinbefore. The portion of the light energy coupled into core 24 propagates therein to the end of fiber 22 adjacent light source 28 where this portion is either reflected or lost. However, the portion of the light energy coupled into cladding layer 26 is removed by disk 32 of fiber tap 30 and converted into representative electrical signal by photodetector 34.

From the foregoing discussion, it becomes clear that the present directional coupler and power tap 10 can advantageously be used to determine either the location of a defect in core 14 or the overall length of transmission fiber 12. In such application, light source 28 injects a narrow pulse of light energy into transmission fiber 12 via the present directional coupler and power tap 10, and the time necessary for the light pulse to propagate to the defect or to the far end of transmission fiber 12 and back again to fiber tap 30 is recorded.

From the recorded round-trip propagation time, the distance to the defect in core 14, or the overall length of transmission fiber 12, can be calculated by well-known mathematical means.

Alternatively, a separate directional coupler and power tap 10 and light source 28 can be coupled to each end of transmission fiber 12 to accomplish two directions of communication over the same fiber 12. When transmission fiber 12 is used for one-way transmission, the allowable fiber loss is typically 30–50 dB depending upon the system.

For two-way operation, the isolation between a light source 28 and the adjacent fiber tap 30 preferably should be ~10 dB more than the one-way loss between the light source 28 at the other end of transmission fiber 12 and and the same fiber tap 30. The degree of isolation obtained is dependent primarily upon the ability of stripper-absorber means 40 to isolate fiber tap 30 from spurious cladding modes introduced into second fiber 22 by adjacent light source 28. Therefore, by increasing the area of contact between stripper-absorber means 40 and cladding layer 26, the degree of isolation can be increased. Additionally, the degree of isolation can be improved by employing means for guiding the light from source 28 directly into core 24 of second fiber 22 as disclosed, for instance, in the hereinbefore cited patents of F. P. Kapron et al. and G. Smolinsky et al. Furthermore, for two-way transmission, there should be sufficient mode coupling in transmission fiber 12 so that power launched into one end of transmission fiber 12 via small-core second fiber 22 becomes more uniformly distributed amongst the modes in the core 14 of transmission fiber 12 by the time the power reaches the other end of fiber 12. If necessary, any well-known mode mixing arrangement, such as, for example, a "mechanically" induced mode mixer, can be included at both ends of transmission fiber 12.

It is to be understood that the above-described embodiments are simply illustrative of the principles of the invention. Various other modifications and changes may be made by those skilled in the art which will embody the principles of the invention and fall within the spirit and scope thereof. For example, it is also possible to add a separate stripper-absorber means adjacent coupling point 18 in contact with cladding layer 16 of transmission fiber 12 to prevent spurious cladding modes in cladding layer 16 from reaching fiber tap 30 when two-way transmission is used. Additionally, the power tap 30 could be replaced by a branching optical waveguide (not shown) which diverges from second optical waveguide 22 at a preferred acute angle towards stripper-absorber means 40. The preferred acute angle can easily be calculated using Snell's law. The branching optical waveguide would comprise a core surrounded by cladding material where one end of the core of the branching waveguide engages cladding layer 26 of second optical waveguide 22, the core having an index of refraction which is equal to or greater than the index of refraction of the cladding material 26 of second waveguide 22.

What is claimed is:

1. A directional optical waveguide coupler and power tap capable of coupling core-guided modes propagating in a first direction out of a transmission optical waveguide and avoiding loss of core-guided modes which may be propagating in a second direction, the transmission optical waveguide including a core surrounded by a layer of cladding material having a refractive index which is less than the refractive index of the core material, the directional coupler and power tap comprising a second optical waveguide comprising a core having a given refractive index surrounded by a layer of cladding material having a refractive index which is less than the refractive index of said second waveguide core material, the core of said second waveguide having a cross-sectional area which is significantly smaller than the cross-sectional area of the core of the transmission waveguide, and one end of said second waveguide being abutted with an end of the transmission waveguide in a manner to permit a significant amount of the core-guided modes propagating in the first direction in the transmission waveguide to be coupled into the cladding layer of said second waveguide at said abutting point and to permit core-guided modes introduced at the other end of said second waveguide and propagating in a second direction in said second waveguide to be coupled primarily into the core of the transmission waveguide at said abutting point, and means disposed at a first intermediate position along the peripheral surface of said second optical waveguide capable of coupling out of the cladding layer of said second waveguide the cladding modes coupled therein primarily from the core of said transmission waveguide for subsequent conversion to a representative electrical signal.

2. A directioanl optical waveguide coupler and power tap according to claim 1, wherein said means for coupling out the cladding modes in said second waveguide comprises a body of dielectric material disposed in coupling relationship with the cladding layer of said second optical waveguide, said body having an index of refraction which is equal to or greater than the index of refraction of the cladding material of the second waveguide, and a photodetector responsive to the wavelength of the optical signal to be propagated through said transmission optical waveguide, said photodetector being disposed adjacent said dielectric body and oriented to intercept the optical power coupled out of the cladding of the second optical waveguide by said dielectric body.

3. A directional optical waveguide coupler and power tap according to claim 1, wherein each of said transmission and second optical waveguides comprise an optical fiber waveguide.

4. A directional optical waveguide coupler and power tap according to claim 1, wherein said coupler and power tap further comprises a stripper-absorber means disposed at a second intermediate position along said second optical waveguide downstream of said coupling means in the first direction for removing and absorbing cladding modes propagating therebeneath in said second optical waveguide.

5. A directional optical waveguide coupler and power tap according to claim 4, wherein said stripper-absorber means comprises both a body of dielectric material disposed in coupling relationship with the cladding layer of said second optical waveguide and a light absorbing means, said body having an index of refraction which is equal to or greater than the index of refraction of the cladding material of said second optical waveguide.

6. A directional optical waveguide coupler and power tap according to claim 5, wherein said light absorbing means comprises a layer of light absorbing material formed on said body of dielectric material and oriented to absorb the optical power coupled out of the cladding of said main optical waveguide by said dielectric body.

7. A directional optical waveguide coupler and power tap according to claim 5, wherein said light absorbing means comprises a plurality of light absorbing ions embedded in said body of dielectric material to absorb the optical power coupled out of the cladding of said main optical waveguide by said dielectric body.

* * * * *